Patented Oct. 14, 1941

2,259,109

UNITED STATES PATENT OFFICE 2,259,109

PROCESS FOR OXIDATION OF HALOGEN COMPOUNDS OF CYCLIC KETONES

Hans Hatzig, Mannheim-Waldhof, Germany, assignor to Rare Chemicals, Inc., Nepera Park, N. Y., a corporation of New York No Drawing. Application October 10, 1938, Serial No. 234,333. In Germany October 15, 1937

21 Claims. (Cl. 260—397.3)

My invention relates to a process for oxidizing halogen compounds of cyclic ketones of the sterol series whereby the side chain is partly or completely split off. More especially the object of the invention is the production of valuable hormone active substances in a more simple and even manner and with better yields than before.

It is well known to those skilled in the art, that at the oxidation of unsaturated compounds with the cyclopentanohydrophenanthrene skeleton

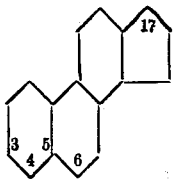

one takes care to withdraw the nuclear double bonds from the influence of the oxidizing agent by adding to them halogen, preferably bromine, before the oxidation. By this roundabout-way of a halogenation and dehalogenation one obtains in most cases a considerably better yield of products of oxidation than by oxidizing directly, i. e. without such a blocking of the nuclear double bonds. For example, in the case of cholesterol, stigmasterol and so on, it is by far better to subject their dibromides to oxidation than the sterols themselves.

However, as to unsaturated ketones, for instance cholestenone, this precaution has not shown up till now any advantages in comparison with the direct oxidation. This is probably due to the fact, that at the action of halogen upon such unsaturated ketones a manifold variety of halogen compounds of said ketones may arise, whereas on halogenation, for example, of unsaturated sterols, well defined addition compounds are formed. Now, on oxidizing and following dehalogenating such a mixture of different products, owing to the presence of halogen compounds which on account of their structure cannot be transformed to the desired substances at all, disturbing secondary reactions will take place, whereby the further treatment of the reaction products is rendered difficult and the yield remains very low.

I have found that the mentioned advantages obtained by the intermediate halogenation, whilst oxidizing sterols and other unsaturated compounds of the sterol series, may be also obtained in the case of the oxidation of unsaturated ketones of this group with the result of partly or completely splitting off the side chain by starting from well defined halogenation products of the corresponding ketones.

I have further found, that for the preparation of substances which either directly possess the activity of hormones or can be easily transformed to hormone active substances those saturated or unsaturated halogen compounds of the sterol series are to be oxidized which on dehalogenation by means of zinc dust are transformed to Δ 4,5-ketones (3) of the sterol series

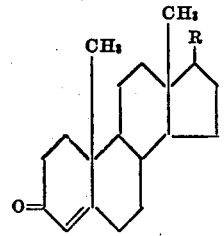

(R=side chain)

By the term "of the sterol series" is meant that the corresponding compounds to which it is applied possess the cyclopentanohydrophenantrene skeleton and the long side chain in position 17 of this skeleton as it is characteristic for sterols of natural origin.

That is, when producing, for instance, androstendione or progesterone, those halogen compounds are concerned which on dehalogenation by means of zinc dust produce, for instance, cholestenone. Such are, for example, 6-bromo-Δ-4,5-cholestenone, 4,5,6-tribromocholestanone, 4,6,6-tribromo - Δ4,5 - cholestenone, 5,6-dibromo-cholestanone, 5,6-dibromo-stigmasterone etc.

The halogen compounds as determined by this rule may be subjected to oxidation either alone or in mixture. Such mixtures, of course, fundamentally differ from the irregular mixtures obtained by the usual action of halogen on cyclic ketones, the former being free from halogen compounds which cannot be transformed to Δ4,5-ketones of the sterol series and consequently cannot be oxidized to the desired substances.

As well defined halogen products of the sterol series can be produced with good yields under certain conditions (compare, for example, Inhoffen, Berichte der Deutschen Chemischen Gesellschaft, tome 69, page 1134, 1702, 2141; Ruzicka, Helvetica Chimica Acta, tome 19, page 1149; E. Dane, Hoppe-Seyler's Zeitschrift für Physiologische Chemie, tome 245, page 86; Butenandt and co-workers, Annalen der Chemie, tome 531, page 176 ff.) and, on the other hand, a simple test by means of zinc dust may determine whether a halogen compound is suitable for the process because the resulting unsaturated ketones of the sterol series are known and can easily be identified by melting-point, specific rotation and other chemical and physical characteristics, it is now possible to convert the whole of an unsaturated ketone of the cyclopentano-hydrophenanthrene series into a form especially adapted for oxidation. Thus, in consequence of my invention, considerably better yields of hormone active substances are obtained than hitherto.

The oxidation may be carried out with strong oxidants, e. g. chromic acid, potassium permanganate, lead tetra-acetate, hydrogen peroxide derivatives etc., preferably in presence of diluents such as, for instance, glacial acetic acid, carbon tetrachloride etc. Under certain conditions also electrolytic oxidation methods may be employed.

The temperature at which the oxidation is carried out may, as a rule, be room temperature, but naturally in some cases lower or higher temperatures may be employed. Of course care must be taken to distribute the oxidizing agent uniformly throughout the reaction mixture, for instance by stirring. After the oxidation is finished an excess of the oxidizing agent which might be present is destroyed by the addition of readily oxidizable substances such as, for example, methanol, formaldehyde or sulfurous acid.

The dehalogenation of the oxidized material is effected by suitable methods, preferably by means of zinc dust, but the application of potassium iodide, catalytic hydrogen etc. may in other cases also be advisable. It is to be noted that previously organic solvents attackable by the applied dehalogenation material, if present, are to be completely removed.

In the course of the further treatment of the reaction products care should be taken to separate the salts and acid constituents from the neutral components. This may be effected, for instance, by diluting the reaction liquid—which must be carefully freed from any excess of the dehalogenating agent by filtering or decanting—with water and then extracting the solution with a solvent not mixable with water, e. g. ether.

For removing acid constituents the extract is shaken with a suitable medium, for instance with caustic soda solution, and then washed and dried. From the neutral portions remaining after evaporating the solvent the non-oxidized ketones are recovered by suitable means, for example by collecting the residue in the least possible quantity of alcohol, preferably 96% alcohol, from which the major part of the non-oxidized ketone will crystallize out.

The valuable hormone-active substances are separated from the neutral portions according to well-known methods; for instance, the different solubility of the single components in suitable solvents may be utilized for separating them from another by means of fractional crystallization. Also specific ketone-reagents such as hydroxylamines, semicarbazides, hydrazines, e. g. phenyl-hydrazine, trimethyl-acethydrazide-ammoniumchloride, acethydrazide-pyridine chloride etc., if required in graduated quantities, may be used, whereupon the resulting compounds are separated and thereafter decomposed by well-known methods. Furthermore the separation may be effected by means of adsorbents, for instance, by alumina or fuller's earth, whereby, as a rule, the desired substances are retained, which afterwards will be extracted therefrom, whereas the concomitant substances are not adsorbed. An advantageous form of such methods of adsorption is the so-called chromatographic adsorption method. Furthermore the separation and purification of the hormone-active substances can be performed by distillation or sublimation in a high vacuum. A further important means is the property of anorganic or organic acids as, for instance, hydrochloric or formic acid, to act as selective solvents on mixtures of the pertinent substances. Of course it may be convenient under certain circumstances to apply several of these methods in any desired sequence or in combination.

*Examples*

(1) To a solution of 60 grams of 6-bromo-Δ-4,5-cholestenone

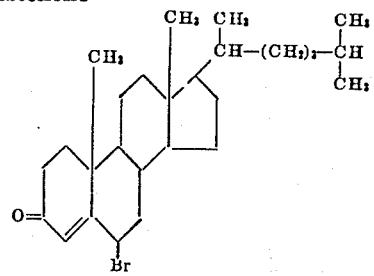

(melting point 132°) in 500 cc. of carbon tetrachloride and 2000 cc. of glacial acetic acid is run in the course of an hour at 20° C. with vigorous stirring, an oxidizing solution which consists of 70 grams of 100% chromic acid, 35 cc. water and 300 cc. of glacial acetic acid.

After the mixture has been stirred for further 20 hours, the free chromic acid yet present is deleted by methyl alcohol, and the carbon tetrachloride is first completely distilled off in vacuo. Only then about 80 grams of zinc dust are added and now the glacial acetic acid is distilled off in vacuo down to about one liter. The unchanged zinc dust is separated by decanting and washing with glacial acetic acid. Hereupon the acetic acid solution is concentrated to about half a liter, diluted with water and shaken with ether. The united ethereal extracts are in order to remove the acid components washed with 2 n caustic soda solution and water and then dried. After evaporating the ether 37.5 grams of neutral portions remain. In these are contained 540 milligrams of progesterone

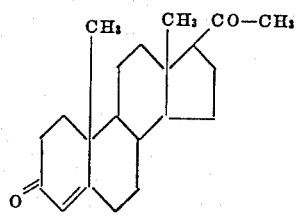

and 45 milligrams of androstendione

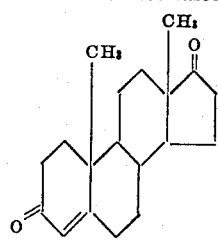

which are separated by the well-known methods referred to in this specification.

(2) To a solution of 80 grams of 4,5,6-tribromocholestanone

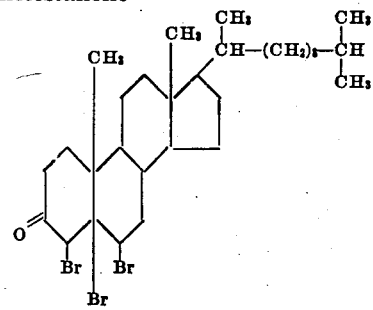

in 2500 cc. of glacial acetic acid is added drop by drop with stirring at a temperature of about 20° C. a solution of 75 grams of chromic acid in 400 cc. of glacial acetic acid and 40 cc. of water. After stirring for some further hours the excess of the oxidizing agent is reduced by formaldehyde, and 120 grams of zinc dust are introduced into the oxidizing solution while cooling. The further treatment corresponds to Example 1. About 37.2 grams of neutral matter are obtained containing the Corner unit (s. Amer. J. Physiol., tome 88, page 326, 340; 1929) in 50 milligrams corresponding to 740 milligrams of progesterone. The Fussgänger unit (s. Medizin u. Chemie, tome 2, page 194; 1934) is contained in 300 gamma, that is about 100 milligrams of androstendione.

(3) 80 grams of 4,6,6-tribromocholestenone

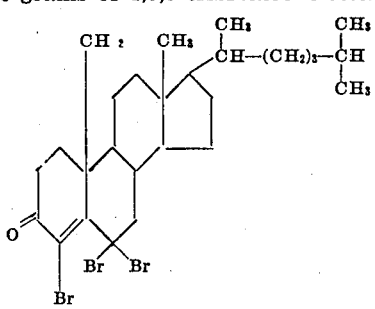

dissolved in 2500 cc. of glacial acetic acid are oxidized with stirring by 4000 cc. of a 5% solution of potassium permanganate and 825 grams of 20% sulfuric acid, both solutions being advantageously added drop by drop and simultaneously to the well agitated solution of glacial acetic acid. For deleting the excess of potassium permanganate oxalic acid is used; for debromination 100 grams of zinc dust are added to the filtered reaction solution.

Yield.—34 grams of neutral substances containing about 340 milligrams of progesterone.

(4) A solution of 70 grams of 5,6-dibromocholestanone

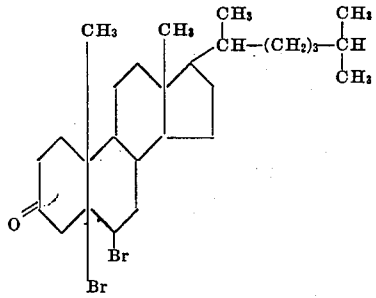

in 1200 cc. of carbon tetrachloride is subjected for several days in a shaking machine at room temperature to the action of a mixture of 2000 cc. of a 3% permanganate solution and 450 cc. of a 20% sulfuric acid. After the oxidation has been finished sulfur dioxide is introduced into the resulting solution up to decoloration. The debromation is effected by 80 grams of zinc dust.

Yield.—28 grams of neutral substances including 140 milligrams of progesterone and 20 milligrams of androstendione.

(5) To a solution of 70 grams of 5,6-dibromostigmasterone

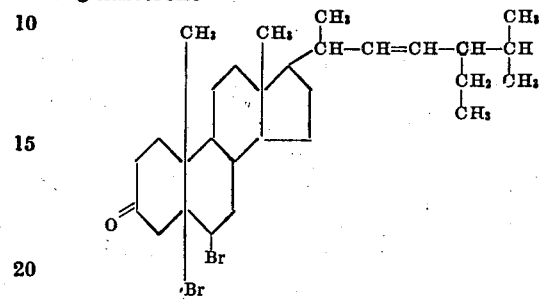

in 2500 cc. of glacial acetic acid is cautiously added in rations with stirring a solution of 270 grams of freshly prepared lead tetraacetate in 1000 cc. of glacial acetic acid. After the oxidation is finished the resulting solution is evaporated to a considerable extent and separated from the severed lead acetate. The further steps are the same as those described in Example 1.

Various changes may be made in the details disclosed in the foregoing specification without departing from the invention or sacrificing the advantages thereof.

In the claims affixed to this specification no selection of any particular modification of the invention is intended to the exclusion of other modifications thereof, and the right to subsequently make claim to any modification not covered by these claims is expressly reserved.

I claim:

1. The process for oxidization of halogen compounds of cyclic ketones of the sterol series whilst splitting off the side chain to retain not more than 2 C atoms of the chain comprising subjecting to oxidation a halogen compound selected from the group consisting of halogenated compounds of the sterol series in which at least one halogen is in the 4, 5, or 6 position as can be transformed to Δ4, 5-ketones (3) of the sterol series by means of zinc dust, and separating the components of the reaction product in accordance with the well-known methods.

2. The process for oxidization of halogen compounds of cyclic ketones of the sterol series whilst splitting off the side chain to retain not more than 2 C atoms of the chain comprising subjecting to oxidation a halogen compound selected from the group consisting of halogenated compounds of the sterol series in which at least one halogen is in the 4, 5, or 6 position as can be transformed to cholestenone by means of zinc dust, and separating the components of the reaction product in accordance with the well-known methods.

3. The process for oxidization of halogen compounds of cyclic ketones of the sterol series whilst splitting off the side chain to retain not more than 2 C atoms of the chain comprising subjecting to oxidation a bromine compound of the sterol series in which at least one bromine is in the 4, 5, or 6 position as can be transformed to cholestenone by means of zinc dust, and seprating the components of the reaction product in accordance with the well-known methods.

4. The process for oxidization of halogen compounds of cyclic ketones of the sterol series whilst splitting off the side chain to retain not more than 2 C atoms of the chain comprising subjecting 6-bromo-Δ4,5-cholestenone to oxidation and separating the components of the reaction product in accordance with the well-known methods.

5. The process for oxidization of halogen compounds of cyclic ketones of the sterol series whilst splitting off the side chain to retain not more than 2 C atoms of the chain comprising subjecting 4,5,6-tribromocholestanone to oxidation and separating the components of the reaction product in accordance with the well-known methods.

6. The process for oxidization of halogen compounds of cyclic ketones of the sterol series whilst splitting off the side chain to retain not more than 2 C atoms of the chain comprising subjecting 4,6,6-tribromo-cholestenone to oxidation and separating the components of the reaction product in accordance with the well-known methods.

7. The process for oxidization of halogen compounds of cyclic ketones of the sterol series whilst splitting off the side chain to retain not more than 2 C atoms of the chain comprising subjecting 5,6-dibromocholestanone to oxidation and separating the components of the reaction product in accordance with the well-known methods.

8. The process for oxidization of halogen compounds of cyclic ketones of the sterol series whilst splitting off the side chain to retain not more than 2 C atoms of the chain comprising oxidizing by means of chromic acid a halogen compound selected from the group consisting of halogenated compounds of the sterol series in which at least one halogen is in the 4, 5, or 6 position as can be transformed to Δ4,5-ketones (3) of the sterol series by means of zinc dust, and separating the components of the reaction product in accordance with the well-known methods.

9. The process for oxidization of halogen compounds of cyclic ketones of the sterol series whilst splitting off the side chain to retain not more than 2 C atoms of the chain comprising subjecting to oxidation a halogen compound selected from the group consisting of halogenated compounds of the sterol series in which at least one halogen is in the 4, 5, or 6 position as can be transformed to Δ4,5-ketones (3) of the sterol series by means of zinc dust, and isolating from the products of oxidation hormone active substances in the well-known manner.

10. The process for oxidization of halogen compounds of cyclic ketones of the sterol series whilst splitting off the side chain to retain not more than 2 C atoms of the chain comprising subjecting to oxidation a halogen compound selected from the group consisting of halogenated compounds of the sterol series in which at least one halogen is in the 4, 5, or 6 position as can be transformed by means of zinc dust to cholestenone, and isolating from the products of oxidation progesterone and androstendione in the well-known manner.

11. The process for oxidization of halogen compounds of cyclic ketones of the sterol series whilst splitting off the side chain to retain not more than 2 C atoms of the chain comprising subjecting to oxidation a halogen compound selected from the group consisting of halogenated compounds of the sterol series in which at least one halogen is in the 4, 5, or 6 position as can be transformed to Δ4,5-ketones (3) of the sterol series by means of zinc dust, and isolating from the products of oxidation the hormone active substances by means of ketone reagents.

12. The process for oxidization of halogen compounds of cyclic ketones of the sterol series whilst splitting off the side chain to retain not more than 2 C atoms of the chain comprising subjecting to oxidation a halogen compound selected from the group consisting of halogenated compounds of the sterol series in which at least one halogen is in the 4, 5, or 6 position as can be transformed to Δ4,5-ketones (3) of the sterol series by means of zinc dust, and isolating from the products of oxidation the hormone active substances by means of acids.

13. The process for oxidization of halogen compounds of cyclic ketones of the sterol series whilst splitting off the side chain to retain not more than 2 C atoms of the chain comprising subjecting to oxidation a halogen compound selected from the group consisting of halogenated compounds of the sterol series in which at least one halogen is in the 4, 5 or 6 position as can be transformed to Δ4,5-ketones (3) of the sterol series by means of zinc dust, and isolating from the products of oxidation the hormone active substances by means of hydrochloric acid.

14. The process for oxidization of halogen compounds of cyclic ketones of the sterol series whilst splitting off the side chain to retain not more than 2 C atoms of the chain comprising subjecting to oxidation a halogen compound selected from the group consisting of halogenated compounds of the sterol series in which at least one halogen is in the 4, 5 or 6 position as can be transformed to Δ4,5-ketones (3) of the sterol series by means of zinc dust, and isolating from the products of oxidation the hormone active substances by means of formic acid.

15. The process for oxidization of halogen compounds of cyclic ketones of the sterol series whilst splitting off the side chain to retain not more than 2 C atoms of the chain comprising subjecting to oxidation a halogen compound selected from the group consisting of halogenated compounds of the sterol series in which at least one halogen is in the 4, 5, or 6 position as can be transformed to Δ4,5-ketones (3) of the sterol series by means of zinc dust, and isolating from the products of oxidation the hormone active substances by means of adsorptive methods.

16. The process for oxidization of halogen compounds of cyclic ketones of the sterol series whilst splitting off the side chain to retain not more than 2 C atoms of the chain comprising subjecting to oxidation a halogen compound selected from the group consisting of halogenated compounds of the sterol series in which at least one halogen is in the 4, 5, or 6 position as can be transformed to Δ4,5-ketones (3) of the sterol series by means of zinc dust, and isolating from the products of oxidation the hormone active substances by fractional distillation.

17. The process for oxidization of halogen compounds of cyclic ketones of the sterol series whilst splitting off the side chain to retain not more than 2 C atoms of the chain comprising subjecting to oxidation a halogen compound selected from the group consisting of halogenated compounds of the sterol series in which at least one halogen is in the 4, 5, or 6 position as can be transformed to Δ4,5-ketones (3) of the sterol series by means of zinc dust, and isolating from the products of oxidation the hormone active substances by fractional crystallization.

18. The process for oxidization of halogen compounds of cyclic ketones of the sterol series whilst splitting off the side chain to retain not more than 2 C atoms of the chain comprising subjecting to oxidation a halogen compound selected from the group consisting of halogenated compounds of the sterol series in which at least one halogen is in the 4, 5, or 6 position as can be transformed to Δ4,5-ketones (3) of the sterol series by means of zinc dust, and isolating from the products of oxidation the hormone active substances by fractional sublimation in a high vacuum.

19. The process for oxidization of halogen compounds of cyclic ketones of the sterol series whilst splitting off the side chain to retain not more than 2 C atoms of the chain comprising subjecting to oxidation at room temperature a halogen compound selected from the group consisting of halogenated compounds of the sterol series in which at least one halogen is in the 4, 5, or 6 position as can be transformed to Δ4,5-ketones (3) of the sterol series by means of zinc dust, and separating the components of the reaction product in accordance with the well-known methods.

20. The process for oxidization of halogen compounds of cyclic ketones of the sterol series whilst splitting off the side chain to retain not more than 2 C atoms of the chain comprising subjecting to oxidation with cooling a halogen compound selected from the group consisting of halogenated compounds of the sterol series in which at least one halogen is in the 4, 5, or 6 position as can be transformed to Δ4,5-ketones (3) of the sterol series by means of zinc dust, and separating the components of the reaction product in accordance with the well-known methods.

21. The process for oxidization of halogen compounds of cyclic ketones of the sterol series whilst splitting off the side chain to retain not more than 2 C atoms of the chain comprising subjecting to oxidation at temperatures up to 100° C a halogen compound selected from the group consisting of halogenated compounds of the sterol series in which at least one halogen is in the 4, 5, or 6 position as can be transformed to Δ4,5-ketones (3) of the sterol series by means of zinc dust, and separating the components of the reaction product in accordance with the well-known methods.

HANS HATZIG.